United States Patent [19]

Washizuka et al.

[11] 4,316,081
[45] Feb. 16, 1982

[54] ELECTRONIC DIGITAL TAPE MEASURE HAVING FLEXIBLE MEASURING TAPE

[75] Inventors: Isamu Washizuka, Soraku; Iwao Tateishi, Yamatokoriyama, both of Japan

[73] Assignee: Sharp Kabushiki Kaisha, Osaka, Japan

[21] Appl. No.: 16,077

[22] Filed: Feb. 28, 1979

[30] Foreign Application Priority Data

Mar. 2, 1978 [JP] Japan ............................. 53-27156[U]

[51] Int. Cl.³ ........................ G01B 3/12; G06M 3/14
[52] U.S. Cl. ................................ 235/92 DN; 33/139;
                                         235/92 MP; 235/493
[58] Field of Search .................. 235/92 DN, 492, 493;
        33/139, 125 R, 125 C; 340/347 M, 347 P, 347
                                              AD; 364/562

[56] References Cited

U.S. PATENT DOCUMENTS 2,267,038 12/1941 Mix ................................ 59/DIG. 1
2,817,824 12/1957 Albright ........................... 235/492 X
3,170,100 2/1965 Rantsch et al. ............... 33/125 C X
3,243,692 3/1966 Heissmeier et al. .......... 33/125 C X
3,780,440 12/1973 Taylor .................................. 33/139
3,812,589 5/1974 Schultheis ......................... 33/129 X
4,031,360 6/1977 Soule ................................... 33/139 X
4,117,600 10/1978 Guignard et al. .............. 364/562 X
4,161,781 7/1979 Hildebrandt et al. ................ 33/140

Primary Examiner—Thomas J. Sloyan
Attorney, Agent, or Firm—Birch, Stewart, Kolasch & Birch

[57] ABSTRACT

An electronic digital tape measure includes a flexible tape, a detector, and a digital display. A keyboard unit and a control circuit may be further included for acting as an electronic calculator. The flexible tape is constructed by allocating a number of magnetic balls a predetermined space from each other and by locating a number of non-magnetic balls to provide the space therebetween. The chain of the balls is covered by flexible synthetic resin or the like. While the flexible tape has no special structure, a holding member is provided within the detector for grasping the flexible tape to be driven in unison with the movement of the flexible tape.

7 Claims, 7 Drawing Figures

ELECTRONIC DIGITAL TAPE MEASURE HAVING FLEXIBLE MEASURING TAPE

BACKGROUND OF THE INVENTION

The present invention relates to an electronic digital tape measure and, more particularly to a flexible measuring tape structure for the electronic digital measure.

A conventional electronic digital tape measure was disclosed, for example, in U.S. Pat. No. 4,031,360 "ELECTRONIC READ OUT TAPE MEASURE" by Soule, Jr., issued on June 21, 1977. In U.S. Pat. No. 4,031,360, a measuring tape was formed of links fitted to each other, with each link perforated with a through hole. That is, the measuring tape had a considerable large volume and the housing of the tape measure was not compact.

However, it is desirable that the tape measure be made compact. Furthermore, since the conventional measuring tape was not flexible per se, it was impossible to determine the length of curves such as the circumferential length of a tube. The conventional measuring tape was apt to damage fingers, etc. because of its sharp edges.

OBJECTS AND SUMMARY OF THE INVENTION

Accordingly, it is the primary object of the invention to provide an improved electronic digital tape measure having superior operability.

It is a further object of the invention to provide a compact electronic digital tape measure.

It is a further object of the invention to provide an improved flexible measuring tape structure for an electronic digital tape measure.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, an electronic digital tape measure of the invention comprises an extensible and flexible tape for extending along a curved surface of an object to be measured, a detector for providing measurement information representing travelled distances of the extensible and flexible tape, and a digital display for providing an indication of the measurement information. The electronic digital tape measure may further include a keyunit and a control circuit for acting as an electronic calculator.

In a specific form of the invention the extensible and flexible tape is constituted by allocating a number of magnetic balls in a predetermined space from each other and by locating a number of non-magnetic balls to provide the space therebetween. The chain of the magnetic balls and the non-magnetic balls is buried within a flexible member such as synthetic resin and the like.

The detector serves to magnetically read out the passing of the magnetic balls for providing counting pulses. The flexibility of the extensible and flexible tape depends upon the strength of the combination of the balls.

In another specific form of the invention, there is included a holding member within the detector for grasping the extensible and flexible tape which has no special structure. In unison with the movement of the extensible and flexible tape, the holding member is allowed to rotate to provide the counting pulses.

BRIEF DESCRIPTION OF THE DRAWINGS

The present invention will become more fully understood from the detailed description given hereinbelow and the accompanying drawings which are given by way of illustration only, and thus are not limitative of the present invention.

DESCRIPTION OF THE INVENTION

Figure 1:
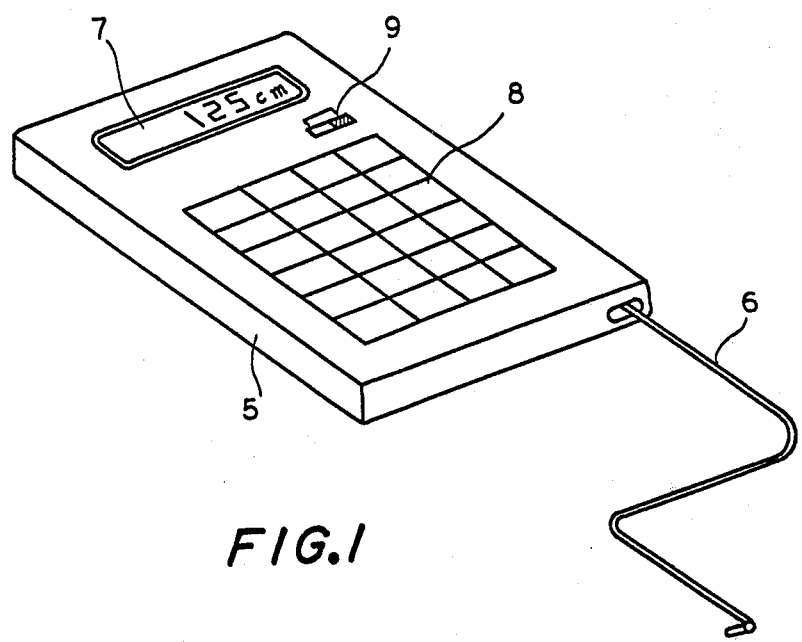
FIG. 1 is a perspective view of an electronic digital tape measure according to the invention.

FIG. 1 shows an electronic digital tape measures 5 according to the present invention comprising a flexible measuring tape 6, a display 7, a keyboard unit 8, and a power switch 9.

The flexible measuring tape 6 is fitted along an object to be measured. The display 7 is adapted to indicate the length of extended tape. The electronic digital tape measure 5 can operate as an electronic calculator as well as a tape measure. The keyboard unit 8 includes digit keys and function keys for introducing functional command. The display 8 is also indicative of the calculated data as an electronic calculator.

Figure 2:
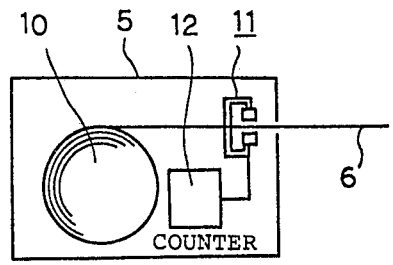
FIG. 2 is a cross-sectional view of the electronic digital tape measure of FIG. 1, showing a functional system involved in the operation of the tape measure with the other parts omitted.

FIG. 2 shows the interior of the electronic digital tape measure 5 showing a tape measure system in accordance with the invention. A biased reel 10 is provided for storing the flexible measuring tape 6 out of use and for causing the extension of the same. A counting pulse generator 11 functions to provide counting pulses on the basis of the passing of the unit length of the flexible measuring tape 6. A counter 12 is responsive to the generated counting pulses for counting them.

Figure 3:
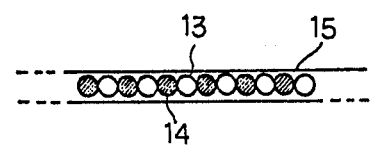
FIG. 3 is a cross-sectional view of an flexible measuring tape according to the invention.

FIG. 3 illustrates the interior construction of the flexible measuring tape 6 of the invention. There are included a number of magnetic balls 13 and non-magnetic balls 14 alternatively which are buried within a synthetic resin tube 15. The flexible measuring tape 6 is constructed as follows.

Through holes have been formed in the centers of the magnetic balls 13 and the non-magnetic balls 14. The balls 13 and 14 are aligned in a line by alternative disposition and by running a flexible thread member through their through holes. The line of the magnetic balls 13 and the non-magnetic balls 14 is subjected to powder coating by soft vinyl chloride or to resin treatment to thereby compose an even thread. The flexibility of the flexible measuring tape 6 depends upon the strength of the combination of the balls 13 and 14.

Figure 4:
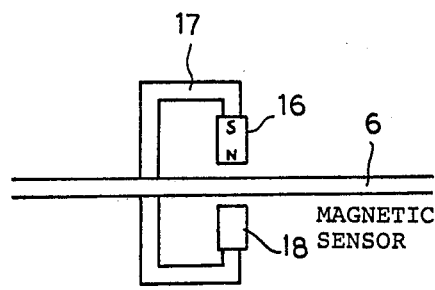
FIG. 4 is a perspective view of a counting pulse generator adapted to detect the passing of the flexible measuring tape shown FIG. 3.

With reference to FIG. 4, the extension of the flexible measuring tape 6 is determined by the counting pulse generator 11 comprising a magnet 16, a yoke 17, and a magnetic sensor 18, e.g., a Hall element. The variations of magnetic flux is carried out each time one magnetic ball 13 within the flexible measuring tape 6 passes nearly the magnetic sensor 18. The magnetic sensor 18 detects the variations of the flux to provide counting pulses corresponding to the number of the variations. Since the magnetic balls 13 have been allocated with a predetermined distance from each other, the number of the variations in the flux corresponds to the extended length of the flexible measuring tape 6.

Figure 5:
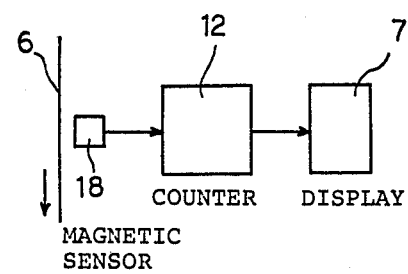
FIG. 5 is a block diagram of a detector and a display according to the invention.

With reference to FIG. 5, there is shown a detector comprising the magnetic sensor 18, the counter 12, and the display 7. The counter 12 causes counting of the counting pulses developed from the magnetic sensor 18. The results are indicated in the display 7 as the measurement data of the extension of the flexible measuring tape 6.

Figure 6:
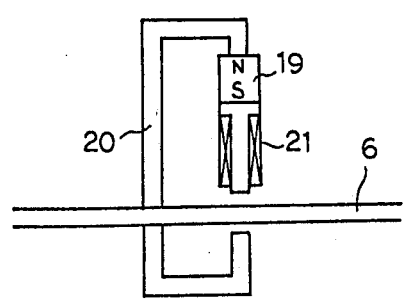
FIG. 6 is a perspective view of another counting pulse generator.

Referring to FIG. 6, this is the same as FIG. 4, except that a sensing coil 21 is provided instead of the magnetic sensor 18. A magnetic and a yoke are denoted as 19 and 20, respectively.

An electric line of force may be used instead of the above-mentioned magnetic flux to detect the passing of the flexible measuring tape where the measuring tape comprises conductive balls and non-conductive balls.

Figure 7:
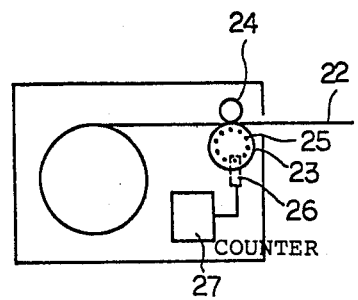
FIG. 7 is a cross-sectional view of another electronic digital tape measure.

FIG. 7 depicts another electronic digital tape measure using a flexible measuring tape without any special structure. The electronic digital tape measure comprises a flexible measuring tape 22, a disk 23 having slits 25, a pressure roller 24, a sensor 26, and a counter 27. The flexible measuring tape 22 does not have any special structure similar to the above-mentioned flexible measuring tape 6.

The flexible measuring tape 22 is held between the disk 23 and the pressure roller 24 so that the disk 23 and the pressure roller 24 are rotated in unison with the passing of the flexible measuring tape 22. While the slits 25 formed on the disk 23 are passing the sensor 26, the counting pulses are provided on the basis of the number of the slits 25 passing. The counter 27 is provided for counting the counting pulses.

A printer may be provided to print out the measurement data although the printer is not described in the above description.

While only certain embodiment of the present invention have been described, it will be apparent to those skilled in the art that various changes and modifications may be made therein without departing from the spirit and scope of the invention as claimed.

What is claimed is:

1. An electronic digital tape measure comprising:
   an extensible and flexible tape including,
      a plurality of discrete magnetic members, and
      a plurality of discrete nonmagnetic members alternately disposed between said magnetic members, said nonmagnetic members spacing said magnetic members at predetermined intervals from each other;
   detector means for sensing the presence of each of said magnetic members which pass said detector means as said tape is extended and for generating a signal in response thereto; and
   counter means responsive to the signal generated by said detector means for accumulating a count representative of the number of magnetic members sensed by said detector, said count being representative of the length of said tape.

2. The electronic digital tape measure according to claim 1, further comprising a digital display for displaying the count accumulated by said counter means.

3. The extensible and flexible tape according to claim 1, wherein said encasement means is formed of a flexible synthetic resin.

4. The tape measure of claim 1 wherein said extensible and flexible tape further includes a flexible encasement means for protecting said magnetic members and retaining them in alignment.

5. The electronic and digital tape measure according to claim 1, wherein said detector means includes a magnet, a magnetic sensor, and a yoke.

6. The electronic and digital tape measure according to claim 5, wherein said magnetic sensor is formed of a Hall element.

7. The electronic and digital tape measure according to claim 5, wherein said detector means senses variations of magnetic flux.

* * * * *